US012638066B2

(12) United States Patent

Yagi et al.

(10) Patent No.: US 12,638,066 B2

(45) Date of Patent: May 26, 2026

(54) UNIT HAVING A POWER TRANSMISSION MECHANISM THEREIN

(71) Applicant: JATCO Ltd, Fuji (JP)

(72) Inventors: Hidekazu Yagi, Atsugi (JP); Kazutoshi Shimozono, Yokohama (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 18/879,127

(22) PCT Filed: May 19, 2023

(86) PCT No.: PCT/JP2023/018695

§ 371 (c)(1),
(2) Date: Dec. 26, 2024

(87) PCT Pub. No.: WO2024/014124

PCT Pub. Date: Jan. 18, 2024

(65) Prior Publication Data

US 2025/0389318 A1 Dec. 25, 2025

(30) Foreign Application Priority Data

Jul. 13, 2022 (JP) ................................ 2022-112096

(51) Int. Cl.
F16H 3/66 (2006.01)
F16H 57/08 (2006.01)

(52) U.S. Cl.
CPC ......... F16H 3/66 (2013.01); F16H 2057/087 (2013.01); F16H 2200/0021 (2013.01);
(Continued)

(58) Field of Classification Search
CPC ................. F16H 3/66; F16H 2057/087; F16H 2200/0021; F16H 2200/0039; F16H 2200/2007; F16H 2200/2038
See application file for complete search history.

(56) References Cited

U.S. PATENT DOCUMENTS 4,086,827 A * 5/1978 Chana ........................ F16H 3/66
475/281
4,089,238 A * 5/1978 Forster ..................... F16H 3/66
475/284

(Continued)

FOREIGN PATENT DOCUMENTS

CN 106979285 A 7/2017
CN 207333597 U 5/2018

(Continued)

OTHER PUBLICATIONS

Thomas Belz, "Varianten von Mehrgang-Planetengetrieben", Mar. 8, 2016, with English translation; https://register.epo.org/application?documentId=EYPWMGE67270DSU&appnumber=EP13756488 &showPdfPage=all.

*Primary Examiner* — Farhana Pervin
(74) *Attorney, Agent, or Firm* — Foley & Lardner LLP

(57) ABSTRACT

Provided is a unit including: an input element; an output element; first to third engagement elements; a first planetary gear mechanism in which the first to third rotational elements are arranged in this order on an alignment chart; and a second planetary gear mechanism in which fourth to sixth rotational elements are arranged in this order on the alignment chart. The input element is connected to the first rotational element and the sixth rotational element, the output element is connected to the second rotational element, one side of the first engagement element is connected to the third rotational element and the fifth rotational element, the other side of the first engagement element is fixed, one side of the second engagement element is connected to the fourth rotational element, the other side of the second engagement element is fixed, and the third engagement
(Continued)

element connects two rotational elements that are selected from the first to sixth rotational elements and are not connected to each other.

8 Claims, 3 Drawing Sheets

(52) U.S. Cl.
CPC ................ *F16H 2200/0039* (2013.01); *F16H 2200/2007* (2013.01); *F16H 2200/2038* (2013.01)

(56) References Cited

U.S. PATENT DOCUMENTS

| | | | | |
|---|---|---|---|---|
| 5,133,697 | A | * | 7/1992 | Hattori .................... F16H 3/666 |
| | | | | 475/276 |
| 11,034,230 | B1 | * | 6/2021 | Shim ...................... F16H 3/724 |

| | | | | |
|---|---|---|---|---|
| 11,421,759 | B2 | * | 8/2022 | McGrew, Jr. ........... F16H 3/725 |
| 2003/0008747 | A1 | * | 1/2003 | Tabata ................... F16H 3/666 |
| | | | | 475/276 |
| 2011/0136616 | A1 | * | 6/2011 | Aota ...................... F16H 3/666 |
| | | | | 475/296 |
| 2012/0244988 | A1 | * | 9/2012 | Aota ...................... F16H 3/66 |
| | | | | 475/281 |
| 2017/0067557 | A1 | * | 3/2017 | Kumazaki ............... B60K 6/20 |
| 2023/0313871 | A1 | * | 10/2023 | Ziemer ................... F16H 3/66 |
| | | | | 180/243 |
| 2023/0392673 | A1 | * | 12/2023 | Mock ...................... F16H 3/62 |
| 2024/0066971 | A1 | * | 2/2024 | Kaltenbach ........... B60K 6/547 |

FOREIGN PATENT DOCUMENTS

| | | | |
|---|---|---|---|
| CN | 109751380 | A | 5/2019 |
| DE | 10 2014 215 156 | A1 | 2/2016 |
| DE | 10 2019 107 517 | B3 | 7/2020 |
| DE | 10 2019 119 947 | A1 | 1/2021 |
| DE | 10 2019 119 949 | A1 | 1/2021 |

* cited by examiner

| | B1 | B2 | CL |
|---|---|---|---|
| FIRST SPEED | ● | | |
| SECOND SPEED | | ● | |
| THIRD SPEED | | | ● |

UNIT HAVING A POWER TRANSMISSION MECHANISM THEREIN

TECHNICAL FIELD

The present invention relates to a unit having a power transmission mechanism therein.

BACKGROUND ART

Patent Document 1 discloses an automatic transmission unit for an electric vehicle with two forward speeds. In the unit, by switching engaged states of two friction clutches, it is possible to achieve a first speed and a second speed having a lower transmission gear ratio (=input rotation speed/output rotation speed) than that of the first speed.

Similar units are disclosed in Patent Documents 2 to 4.

PRIOR ART DOCUMENT

Patent Document

Patent Document 1: German Patent No. 102019107517
Patent Document 2: German Patent Application Publication No. 102019119947
Patent Document 3: German Patent Application Publication No. 102019119949
Patent Document 4: CN207333597U

SUMMARY OF INVENTION

In the automatic transmission unit for an electric vehicle with two forward speeds, a torque amplification effect due to deceleration becomes higher as the transmission gear ratio at the first speed is increased, so that a maximum torque of a motor can be reduced as the transmission gear ratio at the first speed is increased, and a motor having a small size can be selected. On the other hand, the smaller the transmission gear ratio at the second speed, the lower a rotation speed of the motor at the time of achieving a certain vehicle speed, which is advantageous during high-speed cruising.

However, when the transmission gear ratios of the first speed and the second speed are respectively set based on the above design concept, a step ratio (=transmission gear ratio at first speed/transmission gear ratio at second speed) at the time of switching between the first speed and the second speed is increased, and acceleration and deceleration rates of output rotation at the time of shifting is increased.

The present invention has been made in view of such technical problems, and an object of the present invention is to reduce a step ratio at the time of shifting in a unit having a power transmission mechanism therein.

According to an aspect of the present invention, a unit includes:

an input element;
an output element;
a first engagement element;
a second engagement element;
a third engagement element;
a first planetary gear mechanism in which a first rotational element, a second rotational element, and a third rotational element are arranged in this order on an alignment chart; and
a second planetary gear mechanism in which a fourth rotational element, a fifth rotational element, and a sixth rotational element are arranged in this order on the alignment chart.

The input element is connected to the first rotational element and the sixth rotational element.

The output element is connected to the second rotational element.

One side of the first engagement element is connected to the third rotational element and the fifth rotational element.

The other side of the first engagement element is fixed.

One side of the second engagement element is connected to the fourth rotational element.

The other side of the second engagement element is fixed.

The third engagement element connects two rotational elements that are selected from the first to sixth rotational elements and are not connected to each other.

According to the above aspect, three or more gear positions can be achieved by changing engaged states of the first to third engagement elements. As a result, the step ratio is reduced as compared to the unit with two forward speeds, and the acceleration and deceleration rates of the output rotation during shifting can be suppressed to be smaller than that of the unit with two forward speeds. In addition, a more appropriate transmission gear ratio can be set for each gear position.

When the first and second engagement elements are released and the third engagement element is engaged, the transmission gear ratio becomes 1, and all the rotational elements constituting the first and second planetary gear mechanisms rotate at the same rotation speed, so that a power transmission loss caused by differential rotation between the rotational elements can be reduced.

DESCRIPTION OF EMBODIMENTS

Figures 1, 2:
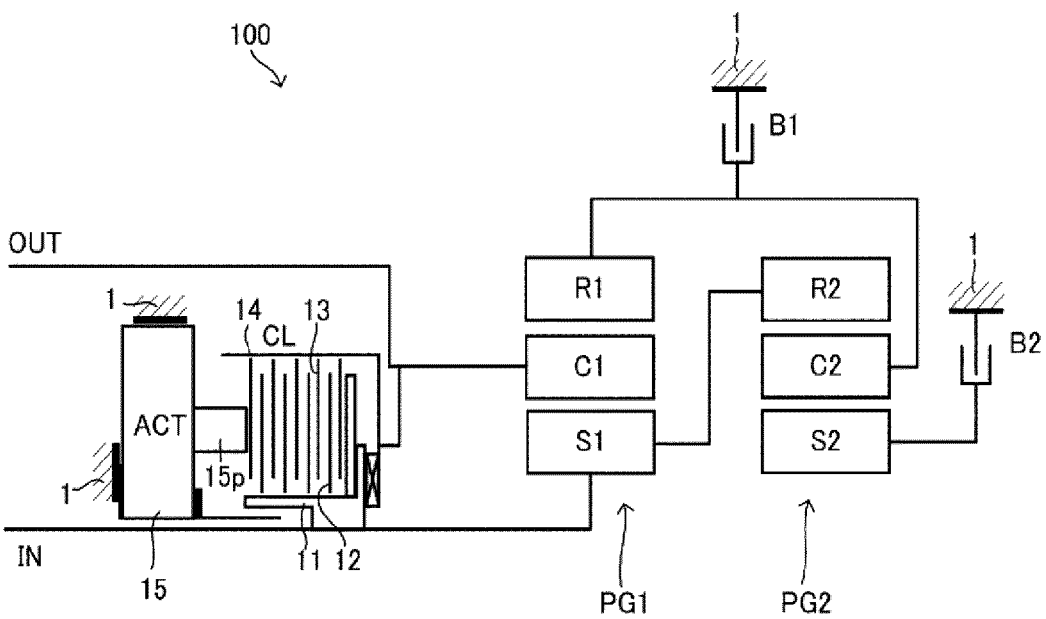
FIG. 1 is a skeleton diagram of a unit according to an embodiment of the present invention.
FIG. 2 is an engagement table showing engaged states of respective engagement elements at respective gear positions.

Hereinafter, embodiments of the present invention will be described with reference to the accompanying drawings. Definitions of terms used in the present description are as follows.

The term of "unit" means a general device having a power transmission mechanism such as a gear mechanism and a differential gear mechanism therein, and includes a motor unit having a motor and a power transmission mechanism, an automatic transmission unit, a reducer unit, and the like.

The term of "transmission gear ratio" is a value obtained by dividing an input rotation speed of the unit by an output rotation speed thereof. The term of "input rotation" includes not only rotation input to the unit from a power source outside the unit but also rotation input to the unit from a power source inside the unit.

The term of "step ratio" is a value obtained by dividing a larger transmission gear ratio (for low speed) by a smaller transmission gear ratio (for high speed) with respect to two transmission gear ratios achieved by the unit.

The term of "axial direction" means an axial direction of a rotating shaft of a component constituting the unit. The component includes a motor, a gear mechanism, a differential gear mechanism, or the like. The term of "radial direction" means a radial direction from a central axis of the rotating shaft.

The term of "housing" means an accommodation body that accommodates a motor, an inverter, and a power transmission mechanism, and includes one or more cases. An aspect in which a case that accommodates the motor, a case that accommodates the inverter, and a case that accommodates the power transmission mechanism are integrally formed is called "3-in-1".

The term of "motor" means a rotating electrical machine having a motor function, and may have a generator function in addition to the motor function.

The expression of "an element A is connected to an element B" means that the element A is connected to the element B on an upstream or downstream side in such a manner that power can be transmitted between the element A and the element B. An input side of the power is the upstream side, and an output side of the power is the downstream side. The element A is not limited to be connected to the element B directly or via another member, and may be connected to the element B via a clutch or the like.

The expression of "the element A is fixed to the element B" includes both an aspect in which the element A is directly fixed to the element B and an aspect in which the element A is fixed to the element B via an element C other than the elements A and B. The expression of "the element A is fixed" means that the element A is fixed to another element and is in a non-rotatable state.

The expression of "the element A and the element B overlap each other when viewed in a predetermined direction" refers to a state in which the element A and the element B are arranged in the predetermined direction (axial direction, radial direction, gravity direction, or the like), and the element A and the element B at least partially overlap each other when observed from the predetermined direction. This is synonymous with the expression of "the element A and the element B overlap in the predetermined direction". In a case where the element A and the element B overlap each other when viewed in the axial direction, the element A and the element B are coaxial. In a case where the element A and the element B are drawn so as to be arranged in the predetermined direction in the drawings, it means that the element A and the element B overlap each other when viewed in the predetermined direction.

On the other hand, the expression of "the element A and the element B do not overlap each other when viewed in the predetermined direction" refers to a state in which the element A and the element B are not arranged in the predetermined direction (axial direction, radial direction, gravity direction, vehicle traveling direction, or the like) and there is no portion at which the element A and the element B overlap each other when viewed from the predetermined direction. This is synonymous with the expression of "the element A and the element B do not overlap each other in the predetermined direction". In a case where the element A and the element B are drawn so as not to be arranged in the predetermined direction in the drawings, it means that the element A and the element B do not overlap each other when viewed in the predetermined direction.

The expression of "the element A is located between the element B and the element C when viewed in the predetermined direction" means that the element A is observed to be between the element B and the element C when observed from the predetermined direction (axial direction, radial direction, gravity direction, or the like). For example, in a case where the element B, the element A, and the element C are arranged in this order along the axial direction, it is observed that the element A is located between the element B and the element C when viewed in the radial direction, so that it can be said that the element A is located between the element B and the element C. The element A does not need to overlap the elements B and C when viewed in the axial direction. In a case where the element A is drawn between the element B and the element C in the drawings, it means that the element A is located between the element B and the element C when viewed in the predetermined direction.

The expression of "disposed close to each other" means a state in which there is a portion where two elements overlap each other when viewed in the axial direction or the radial direction, and no other element is sandwiched between the two elements. For example, the expression of "two engagement elements are disposed close to each other" means that no planetary gear mechanism or the like is disposed between the two engagement elements. In a case where no other element is drawn between the element A and the element B in the drawings, it means that the element A and the element B are disposed close to each other.

The terms of "one side of the engagement element" and "the other side of the engagement element" mean two elements included in the engagement element that become relatively non-rotatable when the engagement element is in an engaged state and become relatively rotatable when the engagement element is in a released state. The terms of "one side of the engagement element" and "the other side of the engagement element" may be a combination of rotational elements or a combination of a rotational element and a non-rotational element, and are generally referred to as a clutch for the former and a brake for the latter. Further, the term of "a single side of the engagement element" means either of "one side of the engagement element" and "the other side of the engagement element".

Other terms are appropriately defined in the description.

FIG. 1 is a skeleton diagram illustrating a basic structure of a unit 100 according to an embodiment of the present invention. The unit 100 is an automatic transmission unit with three forward speeds for an electric vehicle that shifts rotation input to an input element IN from a motor (not illustrated), which serves as a power source, at a transmission gear ratio corresponding to a gear position and transmits the shifted rotation from an output element OUT to a drive wheel (not illustrated). In this example, both the input element IN and the output element OUT are rotating shafts.

The unit 100 is a so-called 3-in-1 unit in which the input element IN, first and second planetary gear mechanisms PG1 and PG2, first to third engagement elements B1, B2, and CL, the output element OUT, the motor (not illustrated), and an inverter (not illustrated) are accommodated in a housing 1. The housing 1 is non-rotatably fixed to the vehicle.

One end of the input element IN is connected to an output shaft of the motor, and the input element IN rotates by power input from the motor. A rotation speed of the input element IN is an input rotation speed of the unit 100. The motor is electrically connected to a battery (not illustrated) outside the unit 100 via the inverter, and functions as a motor by receiving power supply from the battery. The motor can also function as a generator.

The first planetary gear mechanism PG1 is a single pinion planetary gear mechanism including a first sun gear S1 serving as a first rotational element, a plurality of first pinion gears (not illustrated), a first carrier C1 serving as a second rotational element that rotatably supports the plurality of first pinion gears, and a first ring gear R1 serving as a third rotational element. The first sun gear S1 meshes with the plurality of first pinion gears, and the plurality of first pinion gears mesh with the first ring gear R1.

The second planetary gear mechanism PG2 is a single pinion planetary gear mechanism including a second sun gear S2 serving as a fourth rotational element, a plurality of second pinion gears (not illustrated), a second carrier C2 serving as a fifth rotational element that rotatably supports the plurality of second pinion gears, and a second ring gear R2 serving as a sixth rotational element. The second sun gear S2 meshes with the plurality of second pinion gears, and the plurality of second pinion gears mesh with the second ring gear R2.

The first sun gear S1 is connected to the input element IN and the second ring gear R2. The first carrier C1 is connected to the output element OUT. The first ring gear R1 is connected to the second carrier C2.

A rotation speed of the output element OUT is an output rotation speed of the unit 100.

The first engagement element B1 is a brake. The first engagement element B1 is implemented by a hydraulic clutch or an electric clutch. In a case where two portions of the first engagement element B1 to be engaged when the first engagement element B1 is in the engaged state are defined as one side and the other side, the one side is connected to the first ring gear R1 and the second carrier C2, and the other side is fixed to the housing 1. As a result, when the first engagement element B1 is engaged, the first ring gear R1 and the second carrier C2 can be fixed to the housing 1.

The second engagement element B2 is a brake. The second engagement element B2 is implemented by a hydraulic clutch or an electric clutch. In a case where two portions of the second engagement element B2 to be engaged when the second engagement element B2 is in the engaged state are defined as one side and the other side, the one side is connected to the second sun gear S2, and the other side is fixed to the housing 1. As a result, when the second engagement element B2 is engaged, the second sun gear S2 can be fixed to the housing 1.

The third engagement element CL is a clutch. The third engagement element CL is implemented by an electric multi-plate clutch.

The third engagement element CL includes a hub 11, inner friction plates 12 and outer friction plates 13 disposed in a staggered manner, a drum 14, and an electric actuator 15.

The inner friction plates 12 are spline-fitted to an outer periphery of the hub 11, and the inner friction plates 12 are relatively displaceable and relatively non-rotatable in the axial direction with respect to the hub 11. In addition, the hub 11 is spline-fitted to the input element IN, and is non-rotatable with respect to the input element IN.

The outer friction plates 13 are spline-fitted to an inner periphery of the drum 14, and the outer friction plates 13 are relatively displaceable and relatively non-rotatable with respect to the drum 14. In addition, the drum 14 is connected to the first carrier C1 and the output element OUT.

The electric actuator 15 is an actuator that drives the third engagement element CL. When a motor incorporated in the electric actuator 15 is driven, a piston 15p is drawn out in the axial direction, the inner friction plates 12 and the outer friction plates 13 are pressed against each other and are relatively non-rotatable, and the third engagement element CL enters the engaged state. The electric actuator 15 mechanically applies a force to the piston 15p and receives a reaction force thereof from the piston 15p, so that the electric actuator 15 is fixed to the housing 1.

When the motor incorporated in the electric actuator 15 is driven in a reverse direction, the piston 15p retreats, the inner friction plates 12 and the outer friction plates 13 are separated from each other, and the third engagement element CL enters the released state.

Instead of the electric actuator 15, a hydraulic actuator that pushes out the piston 15p by a hydraulic pressure may be used. Oil may be supplied to the hydraulic actuator by a hydraulic supply unit attached to the housing 1 and the like, or may be supplied by a control valve unit including a spool, a solenoid valve, and the like.

In a case where two portions of the third engagement element CL to be engaged when the third engagement element CL is in the engaged state are defined as one side (hub 11) and the other side (drum 14), respectively, the one side is connected to the input element IN, the first sun gear S1, and the second ring gear R2, and the other side is connected to the first carrier C1 and the output element OUT. As a result, when the third engagement element CL is engaged, the input element IN, the first sun gear S1, and the second ring gear R2 are connected to the first carrier C1 and the output element OUT.

Further, since the first sun gear S1 and the first carrier C1 are connected by the third engagement element CL, the third engagement element CL does not need to be disposed between the first planetary gear mechanism PG1 and the second planetary gear mechanism PG2, and a layout design thereof is facilitated.

Examples of an actuator that can be used as the third engagement element CL include an actuator that is susceptible to a layout restriction (an electric actuator that needs to be fixed to the housing 1 or the like due to a reaction force, a hydraulic actuator that needs to attach a hydraulic supply unit to the housing 1 or the like, and the like) and an actuator that is less susceptible to the layout restriction (a hydraulic actuator that supplies a hydraulic pressure from a control valve unit and the like). In a case where the former actuator is used, when it is necessary to dispose the third engagement element CL between the first planetary gear mechanism PG1 and the second planetary gear mechanism PG2, difficulty in the layout design increases.

In this regard, with the disposition illustrated in FIG. 1, the layout design is easy regardless of a type of the actuator, and the degree of freedom in selecting the actuator that drives the third engagement element CL can be increased.

Since the second planetary gear mechanism PG2 is disposed on one side of the first planetary gear mechanism PG1 in the axial direction and the third engagement element CL is disposed on the other side of the first planetary gear mechanism PG1 in the axial direction, the first planetary gear mechanism PG1 and the second planetary gear mechanism PG2 are disposed close to each other. As a result, the degree of freedom in layout of other elements is increased, and the dimension of the unit 100 in the axial direction can be reduced.

The third engagement element CL is disposed coaxially with the first and second planetary gear mechanisms PG1 and PG2, and has a portion overlapping the first planetary gear mechanism PG1 and a portion overlapping the second planetary gear mechanism PG2 when viewed in the axial direction. As a result, a dimension of the unit 100 in the radial direction can be reduced.

FIG. 2 is an engagement table showing relations between the engaged states of the first to third engagement elements B1, B2, and CL and gear positions achieved in the unit 100. In the table, a filled circle indicates an engaged state, and no mark indicates a released state.

As shown in the engagement table, a first speed is achieved by engaging the first engagement element B1 and releasing the second and third engagement elements B2 and CL. A second speed is achieved by engaging the second engagement element B2 and releasing the first and third engagement elements B1 and CL. A third speed is achieved by engaging the third engagement element CL and releasing the first and second engagement elements B1 and B2.

Figure 3:
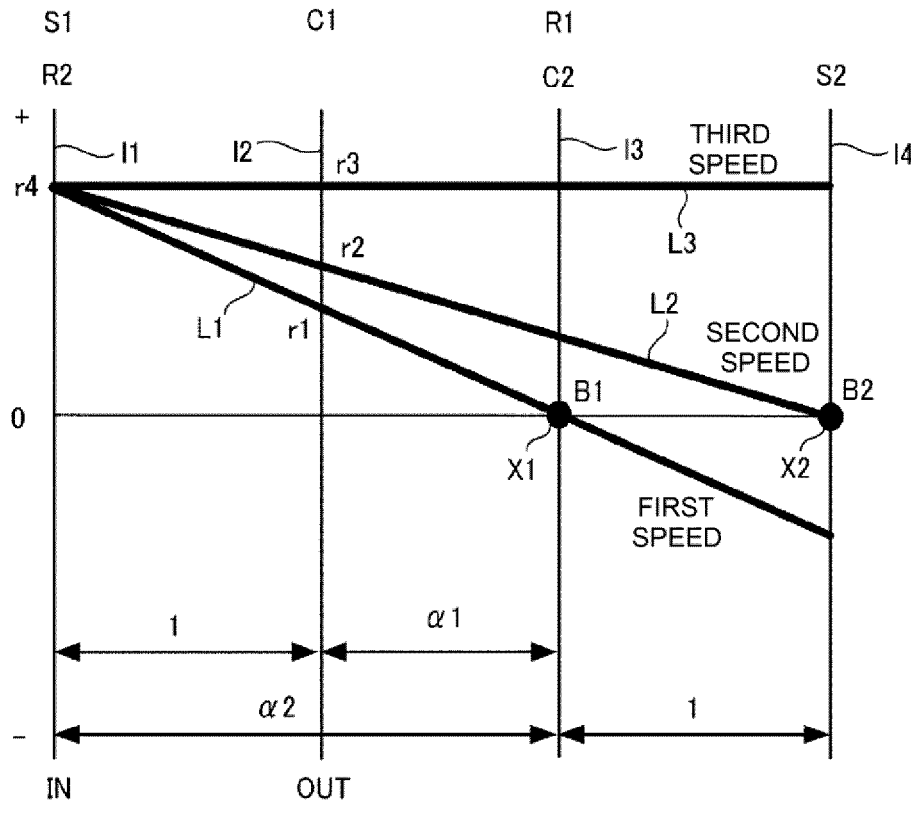
FIG. 3 is an alignment chart of the unit.

FIG. 3 is an alignment chart of the unit 100. In the drawing, vertical lines 11 to 14 correspond to respective rotational elements of the first and second planetary gear mechanisms PG1 and PG2, the first sun gear S1, the first carrier C1, and the first ring gear R1 are arranged in this order from a left side in the drawing for the first planetary gear mechanism PG1, and the second sun gear S2, the second carrier C2, and the second ring gear R2 are arranged in this order from a right side in the drawing for the second planetary gear mechanism PG2.

The first sun gear S1 and the second ring gear R2 are connected to each other, so that the same vertical line 11 corresponds thereto. Similarly, the first ring gear R1 and the second carrier C2 are connected to each other, so that the same vertical line 13 corresponds thereto. An interval a1 between the vertical line 12 and the vertical line 13, when an interval between the vertical line 11 and the vertical line 12 is defined as 1, is a value obtained by dividing the number of teeth of the first sun gear S1 by the number of teeth of the first ring gear R1. In addition, an interval $\alpha2$ between the vertical line 13 and the vertical line 11, when an interval between the vertical line 14 and the vertical line 13 is defined as 1, is a value obtained by dividing the number of teeth of the second sun gear S2 by the number of teeth of the second ring gear R2.

On the alignment chart, straight lines L1 to L3 corresponding to the respective gear positions are drawn. Rotation speeds of respective rotational elements are represented by vertical coordinates of intersections of the straight lines L1 to L3 corresponding to the respective gear positions and the vertical lines 11 to 14.

At the first speed, the first ring gear R1 and the second carrier C2 are fixed to the housing 1 by engaging the first engagement element B1, and the rotation speeds of the first ring gear R1 and the second carrier C2 become zero, so that the straight line L1 corresponding to the first speed is a straight line passing through a point X1.

When the rotation speeds of the first sun gear S1 and the second ring gear R2 are defined as r4 and the rotation speed of the first carrier C1 is defined as r1, an input rotation speed rin of the unit 100 is equal to the rotation speed r4 of the first sun gear S1 and the second ring gear R2, and an output rotation speed rout thereof is equal to the rotation speed r1 of the first carrier C1, so that the transmission gear ratio at the first speed satisfies rin/rout=r4/r1.

In addition, at the second speed, the second sun gear S2 is fixed to the housing 1 by engaging the second engagement element B2, and the rotation speed of the second sun gear S2 becomes zero, so that the straight line L2 corresponding to the second speed is a straight line passing through a point X2.

When the rotation speeds of the first sun gear S1 and the second ring gear R2 are defined as r4 and the rotation speed of the first carrier C1 is defined as r2, the input rotation speed rin of the unit 100 is equal to the rotation speed r4 of the first sun gear S1 and the second ring gear R2, and the output rotation speed rout thereof is equal to the rotation speed r2 of the first carrier C1, so that the transmission gear ratio at the second speed satisfies rin/rout=r4/r2. Since r2 is larger than r1, the transmission gear ratio at the second speed is smaller than the transmission gear ratio at the first speed.

Further, at the third speed, the input element IN, the first sun gear S1, and the second ring gear R2 are connected to the first carrier C1 and the output element OUT by engaging the third engagement element CL, so that the rotation speeds of the respective rotational elements are all equal to r3. As a result, the input rotation speed rin and the output rotation speed rout also become equal to each other, and a transmission gear ratio at the third speed is 1, which is smaller than that at the second speed.

Therefore, in the unit 100, three gear positions including the third speed at which the transmission gear ratio is 1 can be achieved, so that the step ratio is reduced as compared to the unit with two forward speeds, and the acceleration and deceleration rates of the output rotation at the time of shifting can be suppressed to be smaller than that of the unit with two forward speeds. In addition, since the first to third speeds can be used for low speed, medium speed, and high speed, respectively, an appropriate transmission gear ratio can be set according to a speed range.

At the third speed, the transmission gear ratio is 1. That is, all the rotational elements constituting the first and second planetary gear mechanisms PG1 and PG2 rotate at the same rotation speed, so that a power transmission loss caused by differential rotation between the rotational elements can be reduced. In addition, the input element IN and the output element OUT are connected, a power transmission path from the input element IN to the output element OUT becomes the shortest, and the power transmission loss can be further reduced.

Next, modifications of the unit 100 will be described.

Figure 4A:
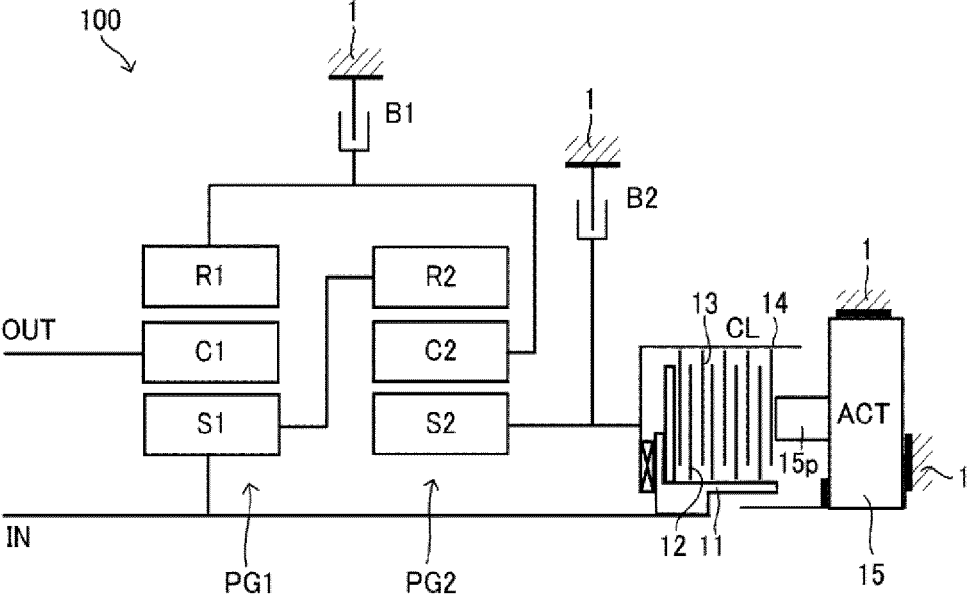
FIG. 4A is a skeleton diagram of a modification of the unit.
Figure 4B:
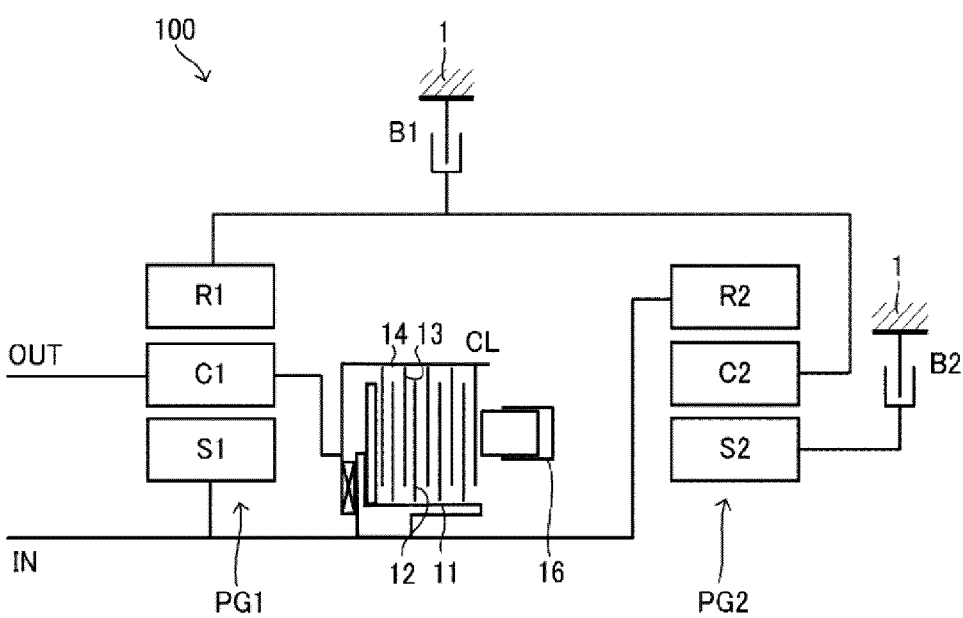
FIG. 4B is a skeleton diagram of a modification of the unit.
Figure 4C:
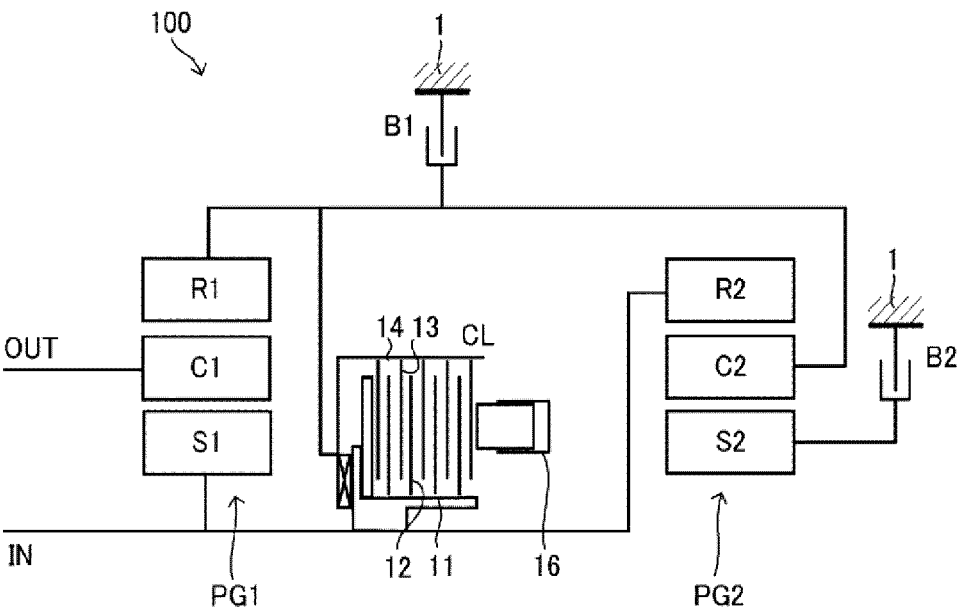
FIG. 4C is a skeleton diagram of a modification of the unit.

FIGS. 4A to 4C are skeleton diagrams of the modifications of the unit 100. A position of the third engagement element CL is different from that in the skeleton diagram illustrated in FIG. 1. The same elements as those in the skeleton diagram illustrated in FIG. 1 are denoted by the same reference numerals.

It is sufficient that the third engagement element CL is engaged to achieve a transmission gear ratio 1, and thus the position of the third engagement element CL may be a position other than that illustrated in FIG. 1.

Specifically, it is sufficient that the straight line L3 corresponding to the third speed is horizontal to achieve the transmission gear ratio 1 on the alignment chart illustrated in FIG. 3, so that any two of the four vertical lines may be selected and rotational elements corresponding to the selected two vertical lines may be connected to each other.

In other words, a combination of two rotational elements that are not connected to each other may be selected from all combinations in a case of selecting two rotational elements from the six rotational elements S1, C1, R1, S2, C2, and R2 of the first and second planetary gear mechanisms PG1 and PG2, except for the combinations already connected (first sun gear S1 and second ring gear R2, and first ring gear R1 and second carrier C2), and the two rotational elements may be connected to each other.

In the modification illustrated in FIG. 4A, the third engagement element CL is disposed at a position where the input element IN, the first sun gear S1, and the second ring gear R2 can be connected to the second sun gear S2. Specifically, the one side (hub 11) of the third engagement element CL is connected to the input element IN, the first sun gear S1, and the second ring gear R2, and the other side (drum 14) thereof is connected to the one side of the second engagement element B2 and the second sun gear S2.

This disposition is suitable for the layout design in which the third engagement element CL is not disposed between the first planetary gear mechanism PG1 and the second planetary gear mechanism PG2. When the third engagement element CL is not disposed between the first planetary gear mechanism PG1 and the second planetary gear mechanism PG2, the degree of freedom in selecting the actuator that drives the third engagement element CL can be increased.

As the actuator that drives the third engagement element CL, the same electric actuator 15 as in the example illustrated in FIG. 1 may be used, or a hydraulic actuator that supplies a hydraulic pressure from a hydraulic supply unit attached to the housing 1 or the like or a control valve unit may be used.

The first planetary gear mechanism PG1 is disposed on the one side of the second planetary gear mechanism PG2 in the axial direction, and the third engagement element CL is disposed on the other side of the second planetary gear mechanism PG2 in the axial direction.

The first planetary gear mechanism PG1 and the second planetary gear mechanism PG2 are disposed close to each other, so that the degree of freedom in layout of other elements is increased, and the dimension of the unit 100 in the axial direction can be reduced.

A single side (drum 14) of the third engagement element CL and the one side of the second engagement element B2 are connected to each other, and thus these can be used as a common component (integrated component). Accordingly, the number of components of the unit 100 can be reduced.

The third engagement element CL is disposed coaxially with the first and second planetary gear mechanisms PG1 and PG2, and has a portion overlapping the first planetary gear mechanism PG1 and a portion overlapping the second planetary gear mechanism PG2 when viewed in the axial direction. As a result, the dimension of the unit 100 in the radial direction can be reduced.

In the modification illustrated in FIG. 4B, the third engagement element CL is disposed at a position where the input element IN, the first sun gear S1, and the second ring gear R2 can be connected to the first carrier C1 and the output element OUT. Specifically, the one side (hub 11) of the third engagement element CL is connected to the input element IN, the first sun gear S1, and the second ring gear R2, and the other side (drum 14) thereof is connected to the first carrier C1 and the output element OUT.

In this disposition, the third engagement element CL is disposed between the first planetary gear mechanism PG1 and the second planetary gear mechanism PG2, so that a hydraulic actuator 16 that supplies a hydraulic pressure from the control valve unit with less layout restriction is preferably used as the actuator that drives the third engagement element CL.

The third engagement element CL is disposed coaxially with the first and second planetary gear mechanisms PG1 and PG2, and has a portion overlapping the first planetary gear mechanism PG1 and a portion overlapping the second planetary gear mechanism PG2 when viewed in the axial direction. As a result, the dimension of the unit 100 in the radial direction can be reduced.

When the third engagement element CL is engaged, the input element IN and the output element OUT are connected in addition to that the transmission gear ratio 1 can be achieved, so that the power transmission path from the input element IN to the output element OUT becomes the shortest, and the power transmission loss can be further reduced.

In the modification illustrated in FIG. 4C, the third engagement element CL is disposed at a position where the input element IN, the first sun gear S1, and the second ring gear R2 can be connected to the first ring gear R1 and the second carrier C2. Specifically, the one side (hub 11) of the third engagement element CL is connected to the input element IN, the first sun gear S1, and the second ring gear R2, and the other side (drum 14) thereof is connected to the one side of the first engagement element B1, the first ring gear R1, and the second carrier C2.

In this disposition, the third engagement element CL is disposed between the first planetary gear mechanism PG1 and the second planetary gear mechanism PG2, so that the hydraulic actuator 16 that supplies a hydraulic pressure from the control valve unit with less layout restriction is preferably used as the actuator that drives the third engagement element CL.

The third engagement element CL is disposed coaxially with the first and second planetary gear mechanisms PG1 and PG2, and has a portion overlapping the first planetary gear mechanism PG1 and a portion overlapping the second planetary gear mechanism PG2 when viewed in the axial direction. As a result, the dimension of the unit 100 in the radial direction can be reduced.

The single side (drum 14) of the third engagement element CL and the one side of the first engagement element B1 are connected to each other, and thus these can be used as a common component (integrated component). Accordingly, the number of components of the unit 100 can be reduced.

Engagement tables and alignment charts of the modifications illustrated in FIGS. 4A to 4C are the same as those of the skeleton diagram of FIG. 1 illustrated in FIGS. 2 and 3.

Next, operations and effects of the embodiment of the present invention will be described.

(1) The unit 100 according to the embodiment of the present invention includes:

the input element IN;

the output element OUT;

the first engagement element B1;

the second engagement element B2;

the third engagement element CL;

the first planetary gear mechanism PG1 in which the first sun gear S1, the first carrier C1, and the first ring gear R1 are arranged in this order on the alignment chart; and the second planetary gear mechanism PG2 in which the second sun gear S2, the second carrier C2, and the second ring gear R2 are arranged in this order on the alignment chart.

The input element IN is connected to the first sun gear S1 and the second ring gear R2.

The output element OUT is connected to the first carrier C1.

One side of the first engagement element B1 is connected to the first ring gear R1 and the second carrier C2.

The other side of the first engagement element B1 is fixed.

One side of the second engagement element B2 is connected to the second sun gear S2.

The other side of the second engagement element B2 is fixed.

The third engagement element CL connects two rotational elements that are selected from the first sun gear S1, the first carrier C1, the first ring gear R1, the second sun gear S2, the second carrier C2, and the second ring gear R2 and are not connected to each other.

According to this configuration, three or more gear positions can be achieved by changing the engaged states of the first to third engagement elements B1, B2, and CL. As a result, the step ratio is reduced as compared to the unit with two forward speeds, and the acceleration and deceleration rates of the output rotation during shifting can be suppressed to be smaller than that of the unit with two forward speeds. In addition, a more appropriate transmission gear ratio can be set for each gear position.

When the first and second engagement elements B1 and B2 are released and the third engagement element CL is engaged, the transmission gear ratio becomes 1, and all the rotational elements constituting the first and second planetary gear mechanisms PG1 and PG2 rotate at the same rotation speed, so that a power transmission loss caused by differential rotation between the rotational elements can be reduced.

(2) In the example illustrated in FIG. 1, the first planetary gear mechanism PG1 and the second planetary gear mechanism PG2 are single pinion planetary gear mechanisms, and the third engagement element CL connects the first sun gear S1 and the first carrier C1.

This disposition is suitable for the layout design in which the third engagement element CL is not disposed between the first planetary gear mechanism PG1 and the second planetary gear mechanism PG2. When the third engagement element CL is not disposed between the first planetary gear mechanism PG1 and the second planetary gear mechanism PG2, the degree of freedom in selecting the actuator that drives the third engagement element CL can be increased.

When the third engagement element CL is engaged, the input element IN and the output element OUT are connected in addition to that the transmission gear ratio 1 can be achieved, so that the power transmission path from the input element IN to the output element OUT becomes the shortest, and the power transmission loss can be further reduced.

(3) In the example illustrated in FIG. 1, the second planetary gear mechanism PG2 is disposed on the one side of the first planetary gear mechanism PG1 in the axial direction, and the third engagement element CL is disposed on the other side of the first planetary gear mechanism PG1 in the axial direction.

According to this configuration, the first planetary gear mechanism PG1 and the second planetary gear mechanism PG2 are disposed close to each other. As a result, the degree of freedom in layout of other elements is increased, and the dimension of the unit 100 in the axial direction can be reduced.

(4) In the example illustrated in FIG. 4A, the first planetary gear mechanism PG1 and the second planetary gear mechanism PG2 are single pinion planetary gear mechanisms, and the third engagement element CL connects the first sun gear S1 and the second sun gear S2.

This disposition is suitable for the layout design in which the third engagement element CL is not disposed between the first planetary gear mechanism PG1 and the second planetary gear mechanism PG2. When the third engagement element CL is not disposed between the first planetary gear mechanism PG1 and the second planetary gear mechanism PG2, the degree of freedom in selecting the actuator that drives the third engagement element CL can be increased.

(5) In the example illustrated in FIG. 4A, the first planetary gear mechanism PG1 is disposed on the one side of the second planetary gear mechanism PG2 in the axial direction, and the third engagement element CL is disposed on the other side of the second planetary gear mechanism PG2 in the axial direction.

According to this configuration, the first planetary gear mechanism PG1 and the second planetary gear mechanism PG2 are disposed close to each other, so that the degree of freedom in layout of other elements is increased, and the dimension of the unit 100 in the axial direction can be reduced.

(6) In the examples illustrated in FIGS. 1 and 4A to 4C, the third engagement element CL has a portion overlapping the first planetary gear mechanism PG1 when viewed in the axial direction. In addition, the third engagement element CL has a portion overlapping the second planetary gear mechanism PG2 when viewed in the axial direction.

As a result, the dimension of the unit 100 in the radial direction can be reduced.

(7) In the examples illustrated in FIGS. 4A and 4C, the single side (drum 14) of the third engagement element CL is connected to the one side of the first engagement element B1 or the one side of the second engagement element B2.

According to this configuration, the single side of the third engagement element CL and the one side of the first engagement element B1 or the one side of the second engagement element B2 can be used as a common component (integrated component), whereby the number of components of the unit 100 can be reduced.

Although the embodiment of the present invention has been described above, the above embodiment merely exemplifies application examples of the present invention and does not intend to limit the technical scope of the present invention to the specific configurations of the above embodiment.

For example, the skeleton diagrams illustrated in FIGS. 1 and 4A to 4C are some of the application examples of the present invention, and the skeleton diagram of the unit to which the present invention is applied is not limited thereto.

Further, the first planetary gear mechanism PG1 and the second planetary gear mechanism PG2 are each a single pinion planetary gear mechanism, but may be double-pinion planetary gear mechanisms.

The present application claims a priority of Japanese Patent Application No. 2022-112096 filed with the Japan Patent Office on Jul. 13, 2022, all the contents of which are hereby incorporated by reference.

DESCRIPTION OF REFERENCE SIGNS 1 housing
100 unit
B1 first engagement element
B2 second engagement element
CL third engagement element
S1 first sun gear (first rotational element)
C1 first carrier (second rotational element)
R1 first ring gear (third rotational element)
S2 second sun gear (fourth rotational element)
C2 second carrier (fifth rotational element)
R2 second ring gear (sixth rotational element)
IN input element
OUT output element
PG1 first planetary gear mechanism
PG2 second planetary gear mechanism

The invention claimed is:
1. A unit comprising: an input element;
an output element;
a first engagement element;
a second engagement element;
a third engagement element;
a first planetary gear mechanism in which a first rotational element being a first sun gear, a second rotational element being a first carrier, and a third rotational element being a first carrier, and a third rotational element being a first ring gear are arranged in this order on an alignment chart; and a second planetary gear mechanism in which a fourth rotational element being a second sun gear, a fifth rotational element being a second carrier, and a sixth rotational element being a second ring gear are arranged in this order on the alignment chart, wherein the input element is connected to the first rotational element and the sixth rotational element, the output element is connected to the second rotational element, one side of the first engagement element is connected to the third rotational element and the fifth rotational element, the other side of the first engagement element is fixed, one side of the second engagement element is connected to the fourth rotational element, the other side of the second engagement element is fixed, and the third engagement element connects two rotational elements that are selected from the first to sixth rotational elements and are not connected to each other.

2. The unit according to claim 1, wherein the first planetary gear mechanism and the second planetary gear mechanism are single pinion planetary gear mechanisms, and the third engagement element connects the first rotational element and the second rotational element.

3. The unit according to claim 2, wherein the second planetary gear mechanism is disposed on one side of the first planetary gear mechanism in an axial direction, and the third engagement element is disposed on the other side of the first planetary gear mechanism in the axial direction.

4. The unit according to claim 3, wherein the third engagement element has a portion overlapping the first planetary gear mechanism when viewed in the axial direction, and the third engagement element has a portion overlapping the second planetary gear mechanism when viewed in the axial direction.

5. The unit according to claim 1, wherein the first planetary gear mechanism and the second planetary gear mechanism are single pinion planetary gear mechanisms, and the third engagement element connects the first rotational element and the fourth rotational element.

6. The unit according to claim 5, wherein the first planetary gear mechanism is disposed on one side of the second planetary gear mechanism in an axial direction, and the third engagement element is disposed on the other side of the second planetary gear mechanism in the axial direction.

7. The unit according to claim 6, wherein the third engagement element has a portion overlapping the first planetary gear mechanism when viewed in the axial direction, and the third engagement element has a portion overlapping the second planetary gear mechanism when viewed in the axial direction.

8. The unit according to claim 1, wherein a single side of the third engagement element is connected to the one side of the first engagement element or the one side of the second engagement element.

* * * * *